United States Patent [19]

Conkling

[11] Patent Number: 5,702,298
[45] Date of Patent: Dec. 30, 1997

[54] UNSHEATHED CABLE ACTIVATED DAMPER CONTROL SYSTEM

[76] Inventor: Stephen J. Conkling, P.O. Box 1369, Merideth, N.H. 03253-1369

[21] Appl. No.: 536,549

[22] Filed: Sep. 29, 1995

[51] Int. Cl.⁶ .................................................. F24F 13/12
[52] U.S. Cl. .......................... 454/322; 251/294; 454/324; 454/335; 454/336
[58] Field of Search ................. 454/290, 322, 454/324, 333, 334, 335, 336; 251/294

[56] References Cited

U.S. PATENT DOCUMENTS

| | | | |
|---|---|---|---|
| 1,064,573 | 6/1913 | Ulrich | 454/324 X |
| 1,111,805 | 9/1914 | Pykett | 454/334 X |
| 1,288,985 | 12/1918 | Prior | 251/294 |
| 2,652,245 | 4/1953 | Bentley . | |
| 3,355,964 | 12/1967 | Day . | |
| 3,507,354 | 4/1970 | Dieckmann et al. | 454/322 X |
| 3,664,633 | 5/1972 | Schaffner | 251/294 |
| 4,188,862 | 2/1980 | Douglas, III | 454/324 |
| 4,579,199 | 4/1986 | Nakayama et al. | 188/299 |
| 4,666,477 | 5/1987 | Lough | 454/334 X |
| 4,679,494 | 7/1987 | Katayama et al. . | |
| 4,838,953 | 6/1989 | Pankowiecki | 137/625.3 |
| 5,588,911 | 12/1996 | Gomez | 454/290 |

*Primary Examiner*—Harold Joyce
*Attorney, Agent, or Firm*—Michael J. Weins

[57] ABSTRACT

A damper control system which employs an unsheathed cable to transmit torque from a torque inducing tool to a damper regulator for regulating a damper of an air processing system. The damper control system has a first cable bracket with a first bracket passage through which the unsheathed cable passes. The first cable bracket is designed to be affixed to a surface accessible to the torque inducing tool. Longitudinal motion of the unsheathed cable with respect to the first cable bracket is limited by a pair of first bracket clips attached to the unsheathed cable and positioned such that the first bracket passage is interposed therebetween. The unsheathed cable is provided with a first cable end which can be engaged by the torque inducing tool and a second cable end which is either permanently affixed to or can be maintained slidable engaged with the damper regulator. Such engagement can be maintained by a set screw in the damper regulator or by a second cable bracket which is fixed with respect to the damper regulator. The second cable bracket has a second bracket passage through which the unsheathed cable passes and a second bracket clip positioned on the unsheathed cable between the second cable end and the second bracket passage.

17 Claims, 8 Drawing Sheets

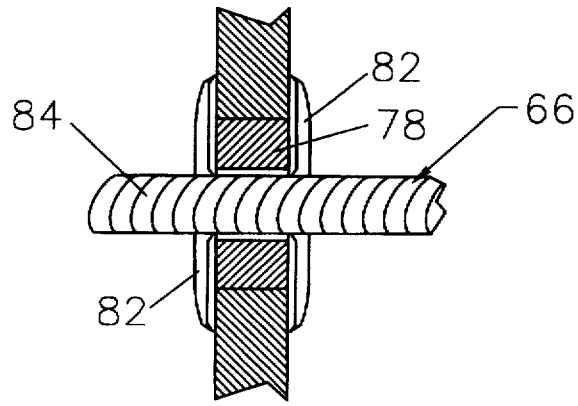
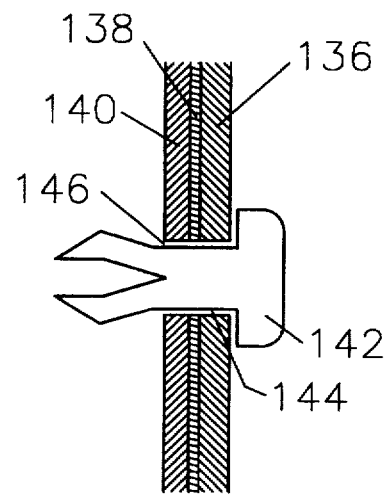
Figure 3
Figure 5
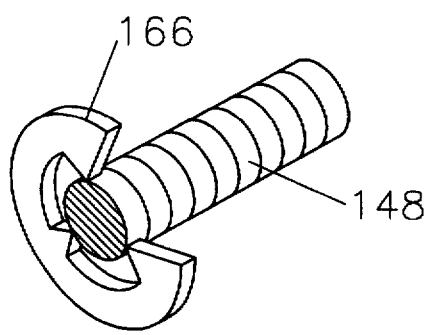
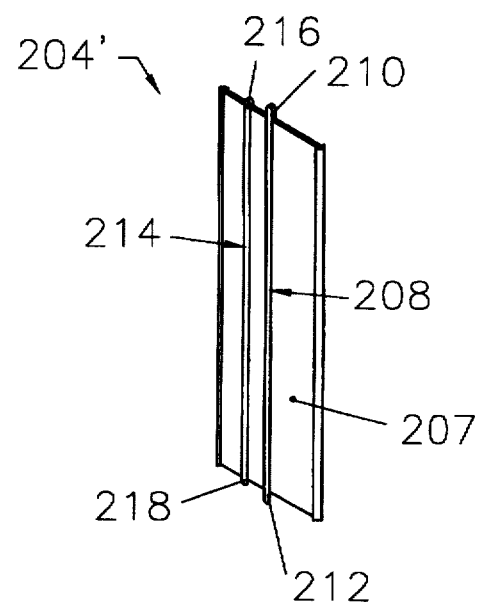
Figure 6
Figure 8

UNSHEATHED CABLE ACTIVATED DAMPER CONTROL SYSTEM

TECHNICAL FIELD OF THE INVENTION

The present invention relates to a damper control system for air processing systems such as heating, ventilating, and air conditioning (HVAC) systems and more particularly one which utilizes an unsheathed flexible torque transmitting cable to activate the dampers.

BACKGROUND OF THE INVENTION

Dampers in air processing systems are used to provide regulation of the air flow to various ducts of the system. Push-pull type cables have classically been used to adjust the dampers. These damper control systems are known as a Bowden type cable control.

U.S. Pat. No. 2,652,245 teaches one system based on a push-pull cable which requires a sheathed cable and complex hardware. Similarly U.S. Pat. No. 4,679,494 is a system which employs a push-pull cable and requires complex hardware for other than flap type dampers. These push-pull cables are only suited for applications where the forces to open and close the damper will be relatively small since push-pull cables buckle when large forces are applied.

Thus there is a need for a cable activated damper control system for air processing systems which utilizes simple hardware and where the load is not limited by the buckling strength of the cable.

OBJECTS OF THE INVENTION

It is an object of the invention to provide a cable activated damper control system with few moving parts for an air processing system such as an HVAC system.

It is another object of the invention to provide a cable activated damper control system which is well suited to be retrofitted to an existing air processing system.

It is still another object of the invention to provide a cable activated damper control system which can be incorporated into a prefabricated element for an air processing system.

It is yet another object of the invention to provide a cable activated damper control system which will operate large dampers.

It is another object of the invention to provide a cable activated damper control system where the cable can be mounted internal to the duct system or external to the duct system.

These and other objects will be apparent from the following description, drawings and claims.

SUMMARY OF THE INVENTION

The present invention provides an unsheathed cable activated damper control system which regulates air flow in air processing systems such as heating, ventilating, and air conditioning (HVAC) systems.

The unsheathed cable activated damper control system of the present invention uses a torque inducing tool to remotely set a damper regulator of a damper in the air processing system. The torque inducing tool can be a wrench, a nut driver, a screwdriver, or a knob. The damper regulator has a regulator axis of rotation about which it turns to activate the damper.

The unsheathed cable activated damper control system has a first cable bracket having a first cable bracket passage therethrough. The first cable bracket is mounted either internal to a duct network of the air processing system or external to it. The first cable bracket preferably is provided with means for surface mounting which allows the first cable bracket when mounted internal to the system to be affixed to a duct which contains the damper. When the first cable bracket is mounted external to the system some other convenient site is chosen. To facilitate mounting on a surface, the mounting means is preferably a mating surface of the first cable bracket having affixing means. An adhesive layer on the planar mating surface is preferred when mounting in a place of limited access such as within a narrow duct. Such an adhesive layer allows the first cable bracket to be fixably positioned with one hand on the surface to which the bracket is to be attached. In some cases, the adhesive may provide sufficient bonding to permanently hold the first cable bracket in place.

To further secure the first cable bracket, mechanical fasteners are preferably employed. In confined locations such as narrow ducts, expandable fasteners can be inserted into pre-drilled holes in the duct to affix the mating surface to the duct. This technique of mounting will allow the first cable bracket to be installed in ducts with a minimum dimension of about 2 inches.

In larger ducts where access is not a problem, screws, nuts and bolts, or rivets may be employed to permanently affix the first cable bracket. Again, this may be done in combination with an adhesive to fixably position the first cable bracket.

An unsheathed flexible torque transmitting cable having a longitudinal axis, a first cable end, and a second cable end passes through the first cable bracket passage. Unsheathed flexible torque transmitting cables are commonly available and generally have a central core of longitudinal parallel strands of wire about which is wound a spring steel wire. The wound spring steel wire provides the cable with a textured surface.

Means for coupling the first cable end to the torque inducing tool are provided. When a wrench such as a socket wrench or nutdriver is used, the first cable end is configured to engage the wrench. Unsheathed flexible torque transmitting cables are commercially available having square cross sections at the cable ends which are well suited to engage a wrench. These square ends serve as the means for coupling the first cable end to the torque inducing tool.

Means for limiting the longitudinal motion of the unsheathed flexible torque transmitting cable with respect to the first cable bracket are provided. In a preferred embodiment, a pair of first bracket clips are attached to the unsheathed flexible torque transmitting cable and positioned such that the first cable bracket passage interposed therebetween serves as means for limiting longitudinal motion of the unsheathed flexible torque transmitting cable with respect to the first cable bracket. The pair of first bracket clips may be bonded to the cable or preferably the pair of first bracket clips are push-on type clips which grip the textured surface of the unsheathed flexible torque transmitting cable.

Means for grippably engaging the second cable end engaged with the damper regulator are provided. The preferred means employed will in part depend on the air processing system into which the unsheathed cable activated damper control system will be implemented; however, in all cases the second cable end will be connected either directly to the damper regulator or via a coupling attached to the damper regulator. Preferably, a damper regulator recess is provided in the damper regulator, or in the coupling attached thereto which is configured to engage the second cable end.

In pre-manufactured ducts, such as plenum slot diffusers, with radial blade dampers where only a short segment of unsheathed flexible torque transmitting cable will be required and the torsional load conditions are known to be small, the unsheathed flexible torque transmitting cable and the first cable bracket can be installed as the plenum is being fabricated. In such instances, it is preferred that the second cable end be permanently affixed to the damper regulator.

In more extensive air processing systems, such as HVAC systems, which are assembled on site or where the unsheathed cable activated damper control system is being retrofitted, it is preferred to have the ability attach the cable on site to the damper regulator. Where a separate cable is employed, it is preferred to provide an unsheathed flexible torque transmitting cable with a second end configured to slidably engage a damper regulator recess, and yet prevent rotational motion between the unsheathed flexible torque transmitting cable and the damper regulator recess. When an unsheathed flexible torque transmitting cable having ends with square cross sections is employed a preferred configuration for the damper regulator recess is a square cross section.

In air processing systems which employ unsheathed flexible torque transmitting cables which slidably engage the damper regulator recess, it is further preferred that a second cable bracket be provided and be fixably mounted with respect to the damper regulator. The second cable bracket has a second cable bracket passage through which the unsheathed flexible torque transmitting cable passes. The second cable bracket passage is aligned with the regulator axis of rotation. Having the second cable bracket passage aligned with the regulator axis of rotation avoids non-axial loads on the damper regulator.

A second bracket clip which attaches to the unsheathed flexible torque transmitting cable in combination with the second cable bracket, provides means for maintaining the second cable end engaged with the damper regulator. The second bracket clip is attached to the unsheathed flexible torque transmitting cable between the second cable bracket, and the second cable end and is positioned such that when in close proximity to the second cable bracket, the second cable end is engaged with the damper regulator recess. Having the clip so positioned limits longitudinal motion of the unsheathed flexible torque transmitting cable with respect to the damper regulator and ensures that the unsheathed flexible torque transmitting cable remains engaged with the damper regulator. It is further preferred that the second bracket clip is an open clip such as an E clip which can be snapped onto the unsheathed flexible torque transmitting cable and can be advanced in either direction along the cable. The second bracket clip is configured to frictionally engage the textured surface of the unsheathed flexible torque transmitting cable so that once positioned it will remain in such position until readjusted.

It is further preferred that the first cable bracket passage and the second cable bracket passage be fitted with bearings and that the bearings preferably be of a polymer such as self-lubricating nylon. It is also preferred that the bearing for the first cable bracket passage have a minimum longitudinal thickness T of about the diameter D of the unsheathed flexible torque transmitting cable.

For extended lengths of the unsheathed flexible torque transmitting cable where the length of cable between the first cable bracket and the second cable bracket is greater than about 60 inches, it is preferred that one or more tie down clips be provided which are positioned between the first cable bracket and the second cable bracket.

BRIEF DESCRIPTION OF THE FIGURES

FIG. 3 is a section view of the pair of bracket clips illustrating their position with respect to the first cable bracket of FIG. 1.

FIG. 5 is a cross section view of a portion of FIG. 4 and illustrates the mounting means for mounting the first cable bracket of FIG. 4.

FIG. 6 is an isometric view of the second bracket clip.

FIG. 8 is an isometric view of one of the blades of the damper of FIG. 7.

FIG. 9 also illustrates the cross section of a second bracket employed with the rectangular damper of FIG. 7.

BEST MODE OF CARRYING THE INVENTION INTO PRACTICE

Figure 1:
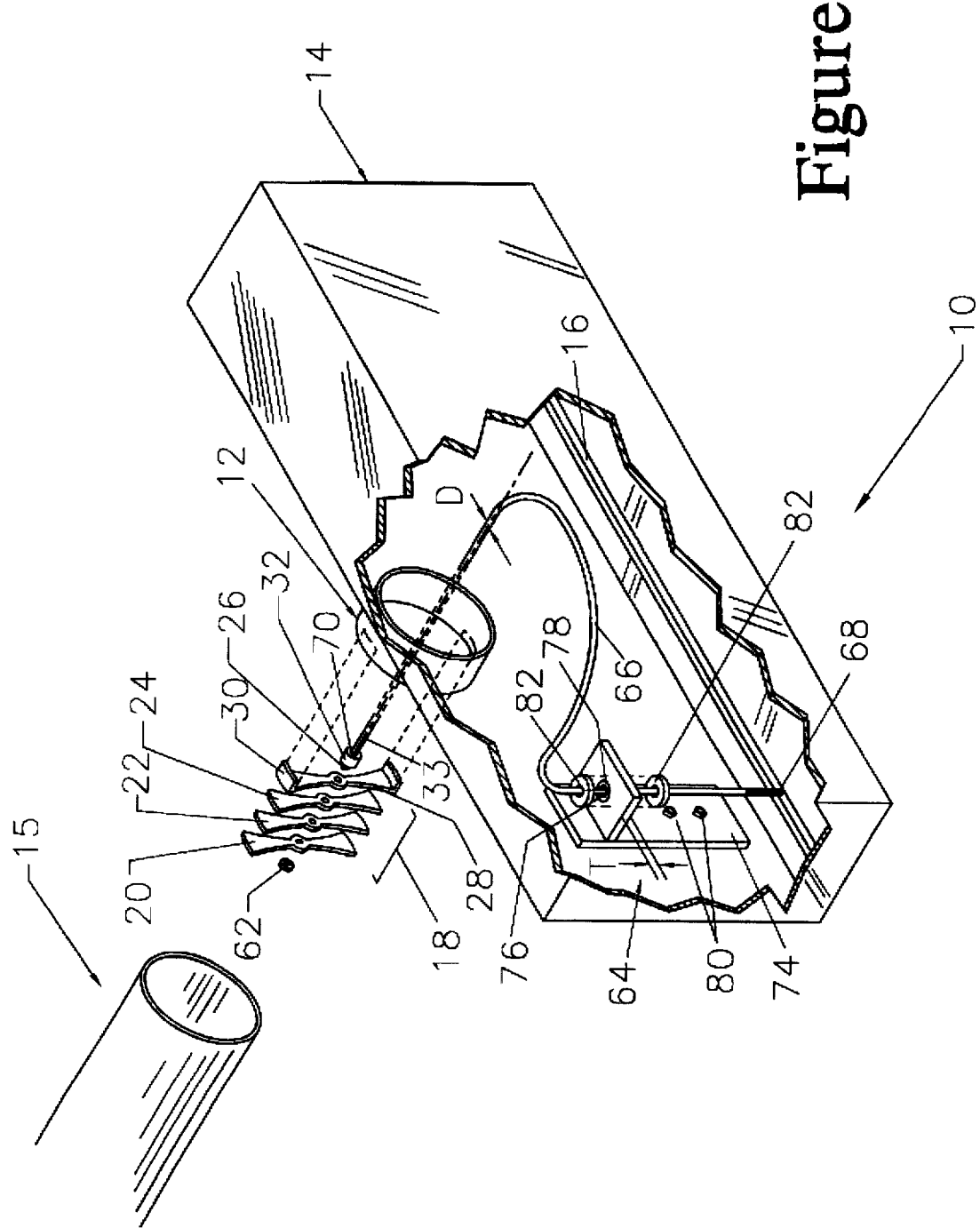
FIG. 1 is a partially exploded isometric view of a pre-manufactured diffuser unit for distributing air flow from a circular supply duct. The diffuser unit has a duct collar for engaging the circular supply duct. The diffuser unit is designed for ceiling mounting and is a rectangular plenum. The diffuser has slots on the bottom for passage of the air. A radial blade damper having a damper regulator is located in the duct collar and regulates the air intake for the diffuser. The diffuser unit has a cable activated damper control system which employs an unsheathed flexible torque transmitting cable and is affixed to the damper regulator.

FIG. 1 is a partially exploded isometric view of a section of a pre-manufactured diffuser unit 10 for use in an air processing system. These diffuser units 10 are assembled prior to installation. The diffuser unit 10 has a duct collar 12 and a diffuser plenum 14 which is designed for installation in a ceiling of a room (not shown). The diffuser plenum 14 receives air from a supply duct 15 which connects to the duct collar 12 and expels air through a diffuser slot 16. To regulate the air flow, a damper 18 is provided in the duct collar 12. The damper 18 has a series of radial blades, an outer blade 20 which is the most distant from the diffuser plenum 14, an intermediate blade 22 which is positioned between the diffuser plenum 14 and the outer blade 20 and an inner blade 24 which is positioned between the intermediate blade 22 and the diffuser plenum 14. The series of radial blades (20, 22, and 24) are mounted on a shaft 26 which in turn is pivotably mounted on a blade brace 28. The blade brace 28 has brace legs 30 which attach to the duct collar 12. A damper regulator 32 having a regulator axis of rotation 33 is attached to the shaft 26 which is co-axial with the regulator axis of rotation 33. As the damper regulator 32 rotates about the regulator axis of rotation 33, the damper regulator 32 rotates the shaft 26 which in turn causes the radial blades (20, 22, and 24) to rotate.

Figure 2:
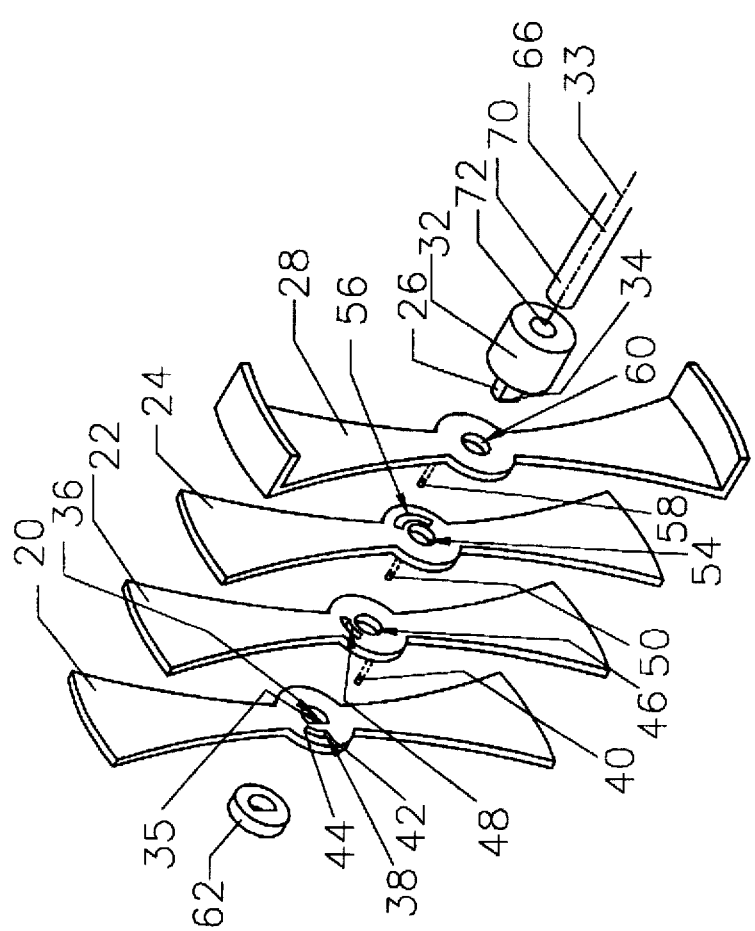
FIG. 2 is an enlargement of the central portion of the radial blades of FIG. 1, illustrating how the radial blades are interconnected to provide sequential opening and closing of the radial blades.

Means are provided to assure that the blades will rotate in a "fan-like" manner with the radial blades (20, 22 and 24) sequentially rotating. FIG. 2 illustrates a means for providing sequential rotation of the radial blades (20, 22, and 24) which employs interlocking elements between the radial blades (20, 22, and 24) to sequentially rotate the radial blades (20, 22 and 24). The outer blade 20 is mounted such that it will rotate in conjunction with the shaft 26. To assure common rotation, the shaft 26 is configured with a facet 34 and an outer blade passage 36 is provided in the outer blade 20 which is configured with a facet engaging lip 35 and slidably engages the shaft 26. The outer blade 20 is also provided with a outer radial slot 38 which engages an intermediate blade protrusion 40 on the intermediate blade 22. The outer radial slot 38 is positioned such that, when the outer radial blade 20 is aligned with the intermediate radial blade 22, the intermediate blade protrusion 40 engages a first end 42 of the outer radial slot 38. When radial blades (20 and 22) are rotated to form a fan, the intermediate blade protrusion 40 engages a second end 44 of the outer radial slot 38. The intermediate blade 22 has an intermediate blade passage 46 which is circular and rotatably engages the shaft 26 allowing the outer blade 20 to be rotated as the shaft 26 is rotated without requiring rotation of the intermediate blade 22. The intermediate blade 22 is also provided with an intermediate radial slot 48 which engages an inner blade protrusion 50 in a similar manner as the outer radial slot 38 engages the intermediate blade protrusion 40. The inner blade 24 is similar to the intermediate blade 22 and has an inner blade passage 54 and an inner radial slot 56 which in turn engages a blade brace protrusion 58 in a similar manner as the outer radial slot 38 engages the intermediate blade protrusion 40. The blade brace 28 has a brace passage 60 through which the shaft 26 passes. The shaft 26 connects to the damper regulator 32 which abuts the blade brace 28. The damper regulator 32 is rotated about the regulator axis of rotation 33 to adjust the series of radial blades (20, 22, and 24) of the damper 18 and modify the air flow through the duct collar 12. The series of radial blades (20, 22 and 24) are maintained in a stacked relationship between the blade brace 28 and a shaft fastener 62 which grippably engages the shaft 26. The pressure differential resulting from the damper's restriction of air flow through the duct collar 12 further stabilizes the radial blades (20, 22, and 24) by providing a frictional force between the blades to resist relative rotation between the radial blades (20, 22, and 24).

An unsheathed cable activated damper control system 64 of the present invention, illustrated in FIG. 1, allows remote control of the damper regulator 32 of the damper 113. The unsheathed cable activated damper control system 64 of FIG. 1 is particularly well suited for pre-manufactured plenums which are assembled prior to installation. In the diffuser unit 10, the dampers 18 is installed with the unsheathed cable activated damper control system 64 while the diffuser unit 10 is being assembled.

The unsheathed cable activated damper control system 64 for the pre-manufactured diffuser unit 10 has an unsheathed flexible torque transmitting cable 66. Such cables have a core which is wrapped with radially wound wire to increase the cable torque resistance. Typically the core is comprised of wire strands which are parallel to the cable axis and the surface of the core has strands of a resilient material such as a spring steel wire. Such cables are described in U.S. Pat. No. 3,664,633 and are commercially available. The unsheathed flexible torque transmitting cable 66 has a first cable end 68 and a second cable end 70. When the first cable end 68 has a square cross section which is commercially available on unsheathed flexible torque transmitting cables, the first cable end 68 can directly serve as means for coupling the unsheathed flexible torque transmitting cable 66 to a torque inducing tool (not shown) such as a socket wrench or nutdriver. When other torque inducing tools are to be used, for example, a screwdriver, then the first cable end 68 is fitted with a slotted head to engage a screwdriver.

In all cases, when a wrench is employed as the torque inducing tool, the first cable end 68 is configured to slidably engage the wrench which, when engaged with the first cable end 68, can be turned to provide a torsional load to the unsheathed flexible torque transmitting cable 66. In the embodiment illustrated, the first cable end 68 has a square cross section and is well suited to engage either a socket wrench or a nutdriver.

The second cable end 70 is contoured to engage a damper regulator recess 72, illustrated in FIG. 2. The damper regulator recess 72 is provided in the damper regulator 32. For prefabricated plenums which are designed to employ short segments of unsheathed flexible torque transmitting cables and in which the torsional load condition is small, it is preferred that the second cable end. 70 be permanently affixed to the damper regulator 32. Welding, braising, or soldering the second cable end 70 in the damper regulator recess 72 are methods that can be used to permanently affix the second cable end 70 to the damper regulator 32.

Soldering or braising are preferred since these techniques provide greater bonding surfaces between the unsheathed flexible torque transmitting cable 66 and the damper regulator 32. Braising or soldering alloys penetrate the interstices between the strands of the unsheathed flexible torque transmitting cable 66 bonding the individual strands with the damper regulator 32. Thus soldering and braising distribute the braising or soldering alloy between the strands as well as between the damper regulator recess 72 and the external surface of the second cable end 70, providing more complete bonding than with welding. One preferred way to affect a braised or a soldered junction is to place the braising or soldering alloy in the damper regulator recess 72 and locally heat the damper regulator 32 with a spot welder by placing the electrodes of the spot welder in contact with the damper regulator 32, in the region of the damper regulator 32 containing the damper regulator recess 72, with the second cable end 70 inside, and supply a current to the electrodes, heating the damper regulator 32 and the second cable end 70 so that the alloy will melt and bond the strands of the second cable end 70 to the damper regulator 32.

A first cable bracket 74 having a first cable bracket passage 76 is provided through which the unsheathed flexible torque transmitting cable 66 passes. The first cable bracket 74 preferably has a first bracket bearing 78 therein to facilitate rotation between the unsheathed flexible torque transmitting cable 66 and the first cable bracket 74. It is further preferred that the first bracket bearing 78 be a journal type bearing and that its length be sufficient to prevent deflection of the first cable end 68 which could otherwise be caused by the curved section of the unsheathed flexible torque transmitting cable 66 which lies between the first cable bracket 74 and the damper regulator 32. It has been found that a nylon bearing having a thickness T of about equal to or greater than the diameter D of the unsheathed flexible torque transmitting cable 66 is preferred.

The first cable bracket 74 is designed to be attached to the diffuser plenum 14. The first cable bracket 74 as illustrated is fastened to the diffuser plenum 14 with sheet metal screws 80. The first cable bracket 74 is positioned on a wall of the diffuser plenum 14 such that the first cable end 68 will be in close proximity to the diffuser slot 16 and is substantially perpendicular to the diffuser slot 16. Having the first cable end 68 so positioned assures ready access of the first cable end 68 by a socket of a socket wrench or nutdriver for adjusting the damper 18.

To limit axial translation of the unsheathed flexible torque transmitting cable 66 with respect to the first cable bracket passage 76 a pair of first bracket clips 82 are provided which are is illustrated in FIGS. 1 and 3. Preferably, these first bracket clips 82 are push-on retainer clips and their position is in close proximity to the first cable bracket passage 76 and the first bracket bearing 78. The first pair of bracket clips 82, when they are push-on retainer clips, grip a textured surface 84 which is provided by the spring steel wire wound about the longitudinal axis of the unsheathed flexible torque transmitting cable 66.

Figure 4:
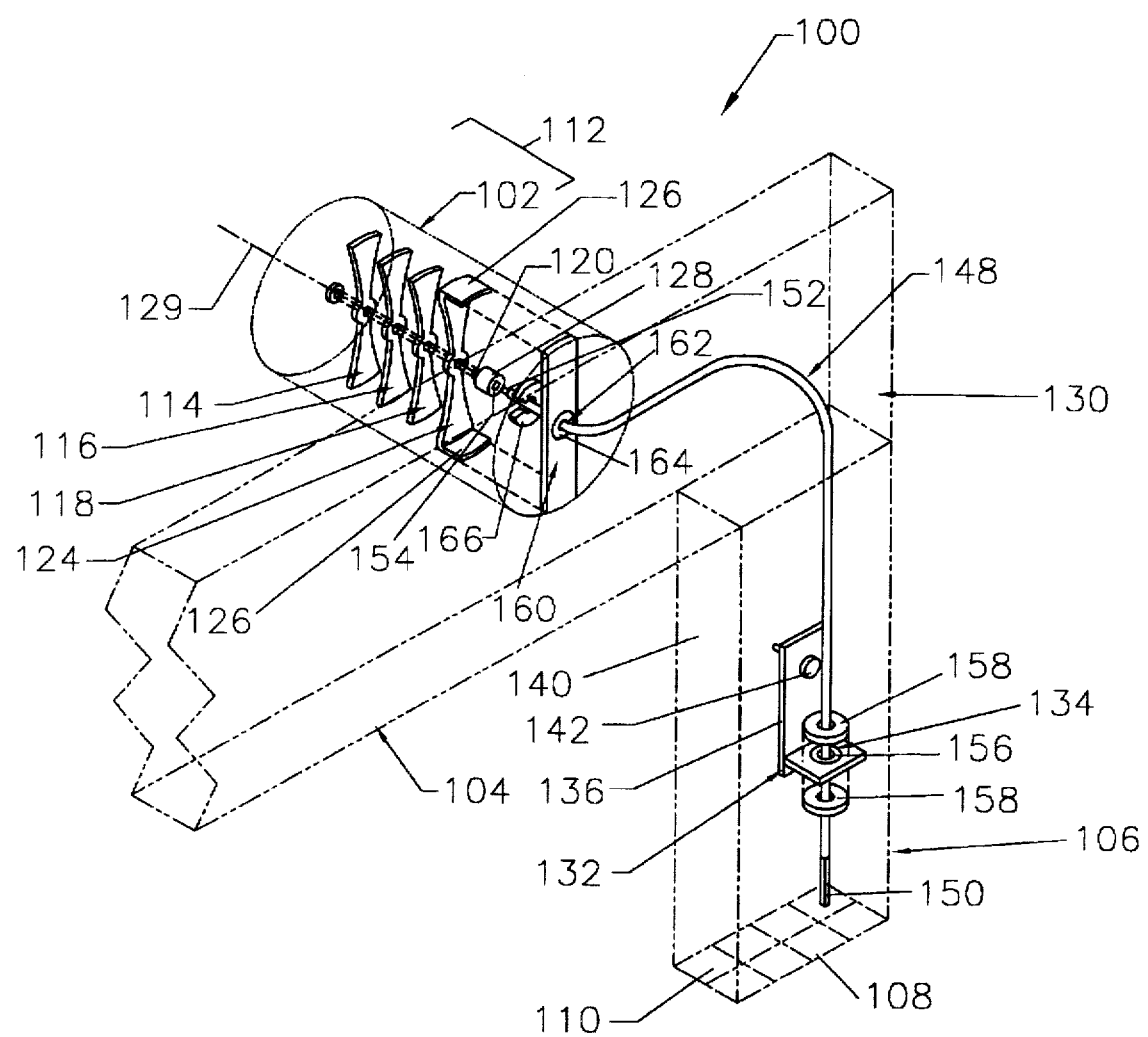
FIG. 4 is an illustration of an embodiment of the present invention installed in a more complex duct network which employs an unsheathed cable activated damper control system having an unsheathed flexible torque transmitting cable which can be disengaged from a damper regulator. A first cable bracket is provided near a first cable end of the unsheathed flexible torque transmitting cable and a second cable bracket is provided near a second cable end of the unsheathed flexible torque transmitting cable. The cable brackets provide support for and position the unsheathed flexible torque transmitting cable.

FIG. 4 illustrates a duct network 100 (shown in phantom) which is more complex than the diffuser unit 10 of FIG. 1. Furthermore, because of its complexity, the duct network 100 is not well suited for prefabrication and the duct network 100 may be partially or fully installed before controls for operating the system are installed. The duct network 100 has a cylindrical duct 102 which supplies air to a first rectangular duct 104, which in turn supplies air to a second rectangular duct 106 which terminates in a grating 108 having passages 110 therethrough. Regulation of the air flow through the duct network 100 is provided by a damper 112 which is housed in the cylindrical duct 102. The damper 112 is a radial blade damper substantially similar to the damper 18 for the diffuser unit 10 illustrated in FIG. 1.

Again the damper 112 has a series of radial blades (114, 116, and 118) mounted on a shaft 120 which is rotatably mounted in a blade brace 124 which is attached to the cylindrical duct 102 via brace legs 126 with fasteners (not shown). The shaft 120 is attached to a damper regulator 128 having a regulator axis of rotation 129. When rotated about the regulator axis of rotation 129, the shaft 120 causes the radial blades (114, 116, and 118) to rotate in sequence to provide a fan style opening and closing. The details of the interaction of the radial blades (114, 116, and 118) and their connection to the shaft 120 are the same as for the embodiment illustrated in FIGS. 1 and 2. An unsheathed cable activated damper control system 130 is again used to drive the damper regulator 128; however, the unsheathed cable activated damper control system 130 differs in detail from the unsheathed cable activated damper control system 64 of FIGS. 1 and 2.

The unsheathed cable activated damper control system 130 has a first cable bracket 132 which has a first cable bracket passage 134. The first cable bracket 132 is provided with a planar mating surface 136 which has an adhesive layer 138 (best seen in FIG. 5) applied thereto. The adhesive layer 138 when applied to a surface 140 of the second rectangular duct 106 will adhere to the surface 140 and secure the first cable bracket 132 to the second rectangular duct 106. Having the adhesive layer 138 allows one to fixably position the first cable bracket 132 to the second rectangular duct 106. In some situations, this will provide sufficient attachment to the duct 106. In other situations, it will allow the fist cable bracket 132 to be positioned before other fasteners are employed. In the embodiment of FIG. 4, additional support for the second rectangular duct 106 is provided by an expandable fastener 142 which passes through a fastener passage 144 (illustrated in FIG. 5) and enters a pre-drilled hole 146 in the second rectangular duct 106 where it expands to lockably engage the first cable bracket 132 to the second rectangular duct 106. Expandable fasteners are preferred where the access region is restricted. Fasteners of the type illustrated can be readily installed when the minimum dimension of the second rectangular duct 106 is as small as about 2 inches.

An unsheathed flexible torque transmitting cable 148, similar to the unsheathed flexible torque transmitting cable 66 described in the discussion of the embodiment of FIGS. 1 and 2, is provided. The unsheathed flexible torque transmitting cable 148 has a first cable end 150 which has a square cross section and is sized to engage a standard wrench socket and a second cable end 152 which has a square cross section which slidably engages a damper regulator recess 154 in the damper regulator 128. The damper regulator recess 154 is axially aligned with the shaft 120 and, having a square cross section, prevents rotational movement between the second cable end 152 and the damper regulator 128 when the second cable end 152 is inserted into the damper regulator recess 154.

The unsheathed flexible torque transmitting cable 148 passes through the first cable bracket passage 134 which is fitted with a first bracket bearing 156, preferably being a nylon journal bearing. The first bracket passage 134 is so positioned in the first cable bracket 132 such that the first cable end 150 will align with the passage 110 of the grating 108 to provide direct access by a socket wrench or nutdriver.

Again, as for the embodiment illustrated in FIGS. 1 and 2, a pair of first bracket clips 158 are provided. The pair of first bracket clips 158 are spaced apart a distance sufficient to accommodate the first bracket bearing 156 but are in close proximity to the first bracket bearing 156 so as to limit the axial motion of the unsheathed flexible torque transmitting cable 148.

In the embodiment of FIG. 4 the installation of the unsheathed flexible torque transmitting cable 148 is to be done on site, thus the second cable end 152 is not permanently affixed to the damper regulator 128. Not having the cable 148 permanently affixed simplifies shipping and allows a cable of appropriate length to be selected on site.

Where the second cable end 152 is not permanently affixed it is necessary to provide additional elements to maintain the second cable end 152 engaged with the damper regulator 128. This relationship can be maintained by providing a second cable bracket 160 having a second bracket passage 162 therethrough. The second cable bracket 160 is attached to the brace legs 126 such that the second bracket passage 162, the damper regulator recess 154, and the shaft 120 are axially aligned. Having these elements so aligned provides for the effective transmission of the torque from the unsheathed flexible torque transmitting cable 148 to the shaft 120. The second bracket passage 162 is fitted with a second bracket bearing 164 which again is preferably a journal bearing. A second bracket clip 166 engages the unsheathed flexible torque transmitting cable 148 and is positioned between the second cable bracket 160 and the second cable end 152. The second bracket clip 166 is an open clip which can be snapped around the unsheathed flexible torque transmitting cable 148, as illustrated in FIG. 6. The second bracket clip 166 can be attached without having the unsheathed flexible torque transmitting cable 148 threaded through the second bracket clip 166. One preferred clip commonly available is an E clip as shown in FIG. 6. The second bracket clip 166 can be readily moved either toward or away from the second cable bracket 160 since it has a spring like character resulting from it being an open clip. When the second bracket clip 166 is advanced along the unsheathed flexible torque transmitting cable 148 to the second bracket bearing 164, the second bracket clip 166, in combination with the second bracket bearing 164 and the second cable bracket 160, serves as the means for maintaining the second cable end 152 engaged with the damper regulator 128.

The above embodiments have been for radial blade dampers where the blades rotate about an axis that is normal to the blade surface. While radial blade dampers are well suited for cylindrical ducts, for rectangular ducts it is frequently preferred to employ rectangular dampers which generally have blades which rotate about axes which are parallel to the blade surfaces.

Figure 7:
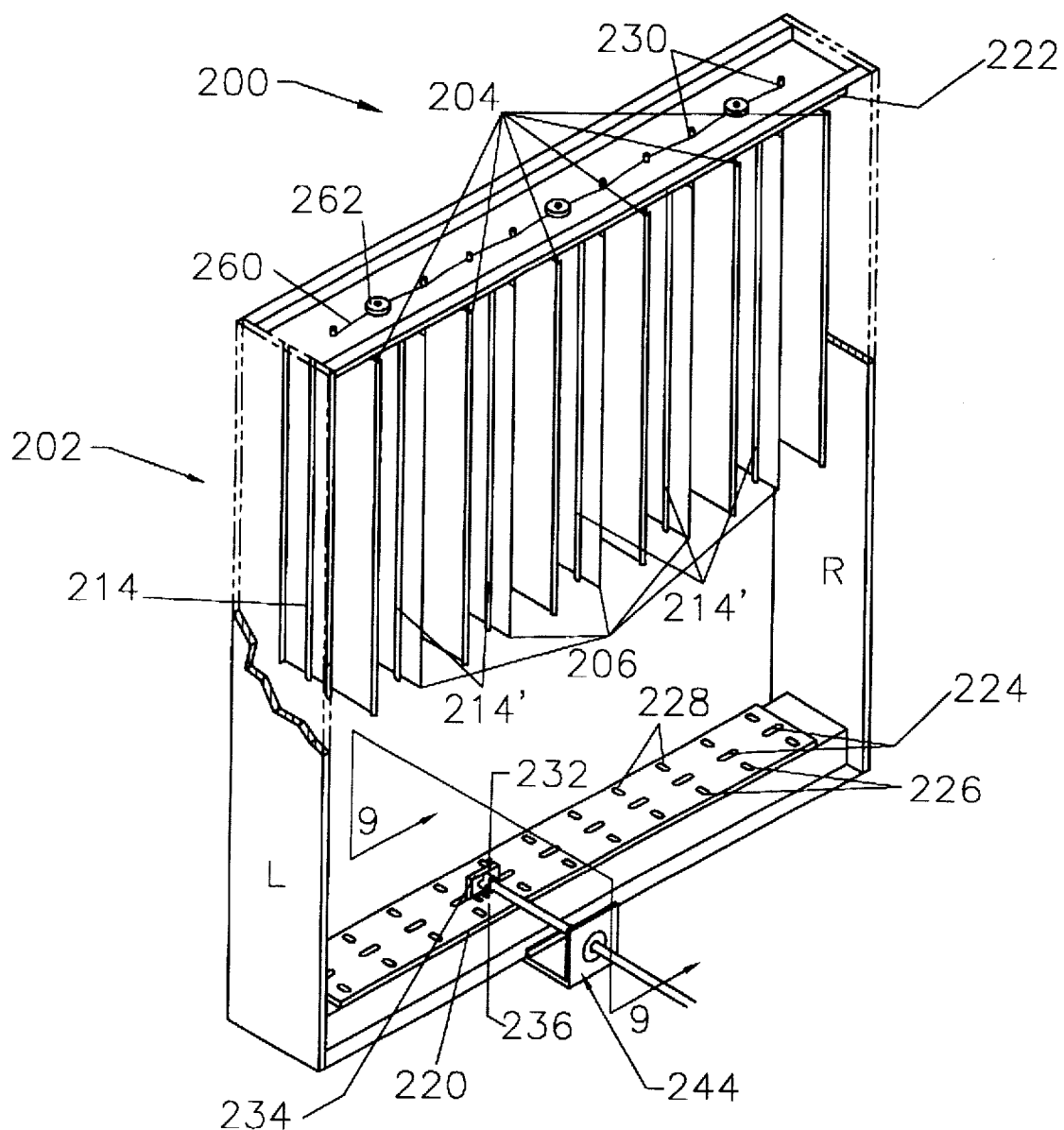
FIG. 7 is a partially exploded isometric view of a damper having a rectangular cross section which includes an embodiment of the present invention. The blades of the damper rotate about a series of parallel axes rather than a common axis as do the dampers illustrated in FIGS. 1 and 4.

FIG. 7 is a partially exploded isometric view of a rectangular damper 200 bounded by a peripheral frame 202 having a left side L and a right side R. The rectangular damper 200 has blades 204, forming a first series of spaced apart blades, and blades 206, forming a second series of spaced apart blades. Both series of spaced apart blades (204, and 206) are identical in shape and differ only in their orientation with respect to the peripheral frame 202.

FIG. 8 is an isometric view of one of the blades 204'. The blade 204' has a rectangular blade face 207 and a pilot shaft 208 which is parallel to the blade face 207 and extends beyond the blade 204', providing an upper mounting end 210 and a lower mounting end 212. A guide pin 214 is parallel to the pivot shaft 208. The guide pin 214 extends beyond the blade 204', providing an upper indexing end 216 and a lower indexing end 218.

The blades (204, and 206) rest on a bottom regulator plate 220 and contact an upper regulator plate 222. The bottom regulator plate 220 and the upper regulator plate 222 are nearly identical. Both have a series of pivot shaft slots 224 which are aligned with their longitudinal axes running from left to right. The regulator plates (220 and 222) have a set of front guide indexing slots 226 and a set of rear guide indexing slots 228. The guide indexing slots (226, and 228) are normal to the pivot shaft slots 224.

The pivot shafts 208 pass through the pivot shaft slots 224 and engage frame pivot shaft holes 230, allowing the blades (204, and 206) to rotate. The guide pins 214' of the second series of spaced apart blades 206 engage the set of front guide indexing slots 226 while the guide pins 214 of the first series of guide blades 204 engage the set of rear guide indexing slots 228. The regulator plates (220 and 222) provide linkage between the blades (204 and 206) and as configured, when the regulator plates (220 and 222) are advanced toward the right side R of the peripheral frame 202, the second series of spaced apart blades 206 will pivot such that their front edges will move in the same direction towards the right side R of the peripheral frame 202, while the first series of spaced apart blades 204 will pivot in the opposite direction, and their front edges will move toward the left side L of the peripheral frame 202. A rectangular damper of this type in which two series of spaced apart blades move in opposite directions is known as an opposed blade damper. It should be appreciated that if all blades were mounted with the same orientation, the blades would all move in the same direction.

The blades (204 and 206) of the rectangular damper 200 are regulated by a pinion gear 232 which is rotatably mounted to a pinion gear support 234 which in turn is mounted to the peripheral frame 202. As the pinion gear 232 is turned, its teeth will engage a rack 236 provided in the bottom regulator plate 220 but not on the upper regulator plate 222. For the embodiment illustrated in FIG. 7 the pinion gear 232 serves as a damper regulator and is provided with a damper regulator recess 238 (shown in FIGS. 9 and 10) which has a square cross section best illustrated in FIG. 10 which is section 10—10 of FIG. 9. The square cross section slidably engages a second cable end 240 of an unsheathed flexible torque transmitting cable 242 which also has a square cross section.

Figure 9:
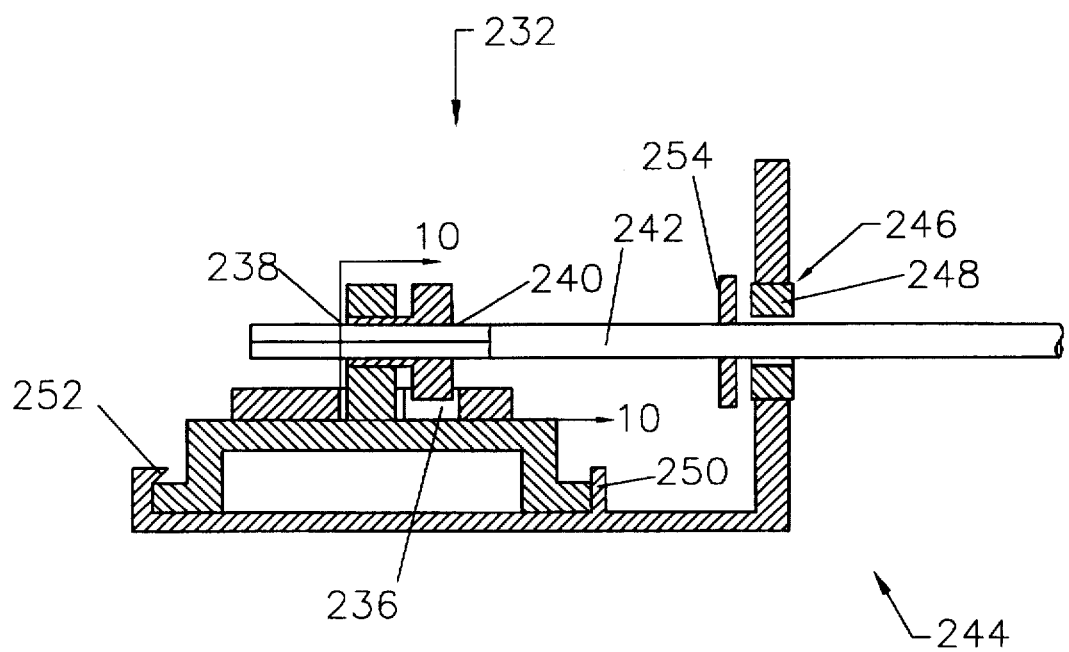
FIG. 9 is a cross section 9—9 of FIG. 7 illustrating the rack and pinion which serves as the damper regulator for the damper of FIG. 7.
Figure 10:
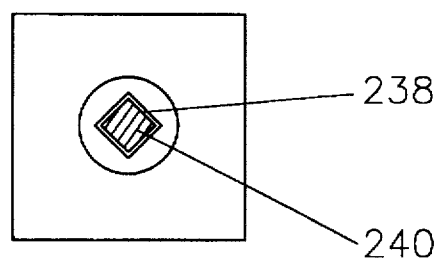
FIG. 10 is section 10—10 of FIG. 9 and shows an end view of the pinion gear and pinion gear support of FIG. 9.

FIG. 9 is a cross section of a second cable bracket 244. The second cable bracket 244 is made from extruded stock, has a second bracket passage 246, and is fitted with a second bracket bearing 248 through which the unsheathed flexible torque transmitting cable 242 passes. The second cable bracket 244 also has a first clamping protrusion 250 and a second clamping protrusion 252 which are spaced apart and positioned such that they snappably engage the peripheral frame 202. A second bracket clip 254 is an E clip such as is illustrated in FIG. 6; its characteristics are described earlier. The second bracket clip 254 slidably engages the unsheathed flexible torque transmitting cable 242 and is positioned in close proximity to the second bracket bearing 248. The second bracket clip 254 as discussed earlier has a spring like characteristic which allows the second bracket clip 254 to be passed over and frictionally grip the textured surface (as illustrated in FIG. 6) of the unsheathed flexible torque transmitting cable 242.

A damper such as illustrated in FIG. 7 is designed to be mounted with the blades vertically. Friction between the bottom regulator plate 220 and peripheral frame 202 provides resistance to the movement of the series of blades (204 and 206) by the air pressure thereon. A wire retaining spring 260 is employed to further stabilize the blades (204 and 206). The wire retaining spring 260 is woven between the pivot shafts 208 and maintained in position with grommets or clips 262 which are intermittently placed on the pivot shafts 208 above the wire retaining spring 260. The remaining elements for the unsheathed cable activated damper control system can be either the elements of the embodiments illustrated in FIGS. 1 and 2 or in FIG. 4.

Figure 11:
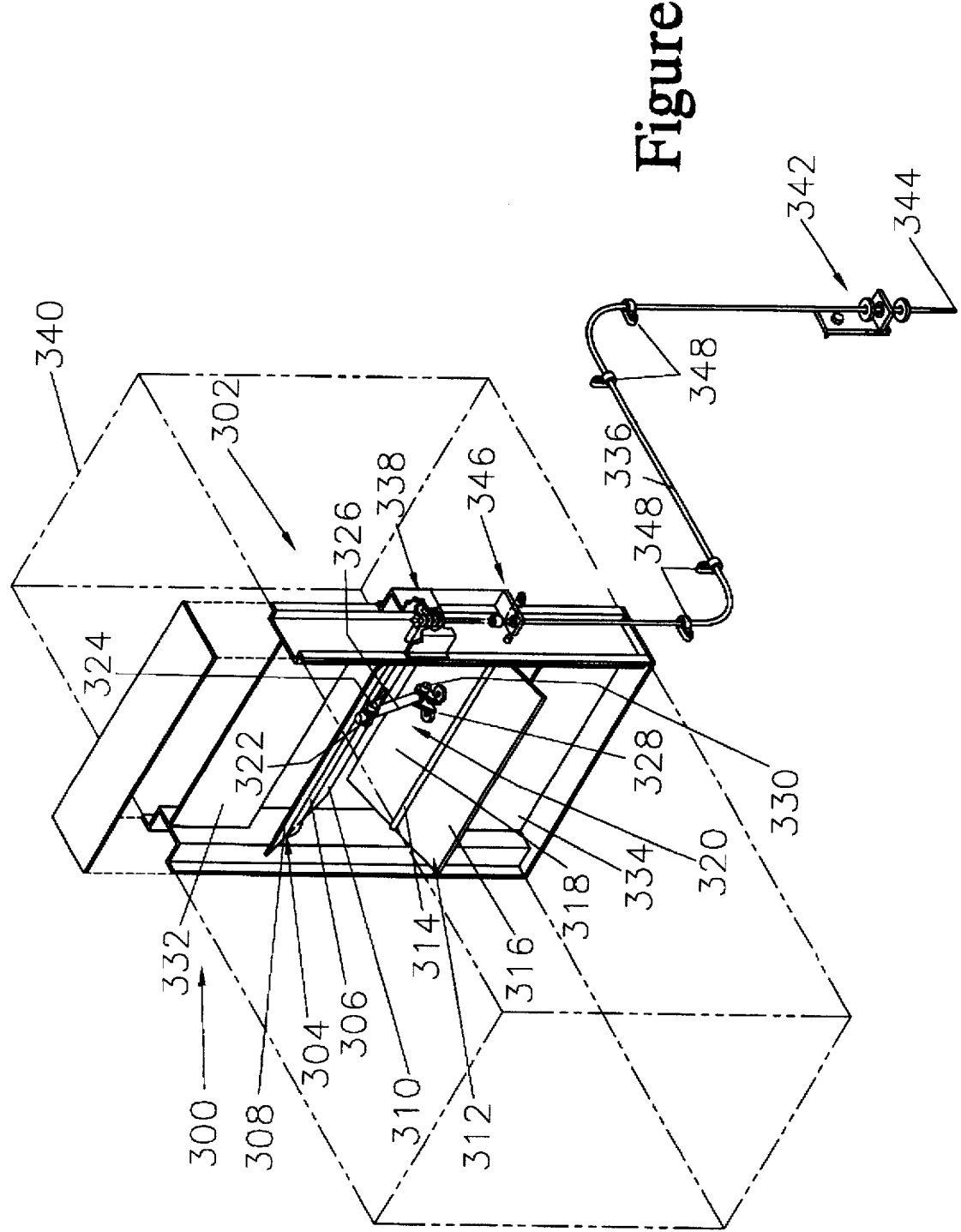
FIG. 11 is an isometric view of another rectangular damper which is mounted in a duct. The blades of the damper are mechanically linked together and are driven by a worm gear assembly which is external to the damper and drives one of the blades. An unsheathed flexible torque transmitting cable, as well as a first cable mount and a second cable mount, form a remote damper operating system which is external to the duct system.

FIG. 11 is an isometric view of a rectangular damper 300 which is typically employed in larger ducts to regulate air flow. The embodiment shown is an opposed blade action damper which is designed to be used when it is desired to have the facility to modulate the air flow.

The rectangular damper 300 has a peripheral frame 302 in which a first damper blade 304 is mounted. The first damper blade 304 has a first blade pivot shaft 306 which rotatably engages the peripheral frame 302. The first blade pivot shaft 306 divides the first damper blade 304 into a first blade front section 308 and a first blade back section 310. A second damper blade 312 is mounted in the peripheral frame 302. The second damper blade 312 has a second blade pivot shaft 314 which is rotatably mounted in the peripheral frame 302. The second blade pivot shaft 314 divides the second damper blade 312 into a second blade front section 316 and a second blade back section 318. While the damper illustrated in FIG. 11 employs two blades and is discussed in terms of a pair of blades, additional blades could be employed.

The opposed action of the damper blades (304, and 312) is provided by a blade control linkage 320. The blade control linkage 320 has a first blade coupling 322 which is mounted to the first damper blade 304 such that its pivot point 324 with respect to a coupling bar 326 projects onto the first blade front section 308. A second blade coupling 328 is attached to the second damper blade 312 such that its pivot point 330 projects onto the second blade back section 318 with respect to the coupling bar 326. When the blade control linkage 320 is so mounted, as the first blade pivot shaft 306 is rotated such that the first blade front section 308 rotates toward a first blade sealing plate 332 which is attached to the peripheral frame 302, the second blade front section 316 will rotate toward a second blade sealing plate 334 which is attached the peripheral frame 302. If additional blades are employed in the rectangular damper 300, then they will have additional blade control linkage to couple the movement to the movement of the damper blades (304 and 312).

Rectangular dampers of the type illustrated in FIG. 11 can be readily operated in sizes as large as 16 square feet cross section by an unsheathed flexible torque transmitting cable 336 having a ¼ inch diameter and being as long as 50 feet, provided a mechanical advantage of 10:1 can be obtained. A worm gear assembly 338 can readily provide such a mechanical advantage. The worm gear assembly 338 also provides resistance to movement of the damper blades (304 and 312) as a result of the air pressure thereon.

It should be appreciated that for smaller dampers, a worm gear assembly will not be required and a damper regulator can be directly attached to the first blade pivot shaft 306. However, in such cases, a stabilizing element such as a spring is needed to maintain the blade in a stable position.

The worm gear assembly 338 is mounted external to a duct 340 in which the rectangular damper 300 is mounted. A first cable bracket 342 may also be mounted external to the duct 340 and be located at some convenient location. For such applications it may be chosen to mount the first cable bracket 342 in a control box (not shown) and have a knob (not shown) attached to a first cable end 344. The worm gear assembly 338 has as an integral part a second cable bracket 346.

When the length of the unsheathed flexible torque transmitting cable 336 between the first cable bracket 342 and the second cable bracket 346 becomes greater than about 60 inches for typical commercially available ¼ inch unsheathed flexible torque transmitting cable or the path becomes convoluted with multiple bends, the unsheathed flexible torque transmitting cable 336 will tend to release the torque load by forming a helix which, once formed, will reduce the torque transmitting capacity of the unsheathed flexible torque transmitting cable 336. For long extensions of cables, tie down clamps 348 should be provided particularly at locations where the direction changes. Placement and spacing of the tie-down clamps 348 should be such as to bracket tightly curved segments of the unsheathed flexible torque transmitting cable 336.

Figure 12:
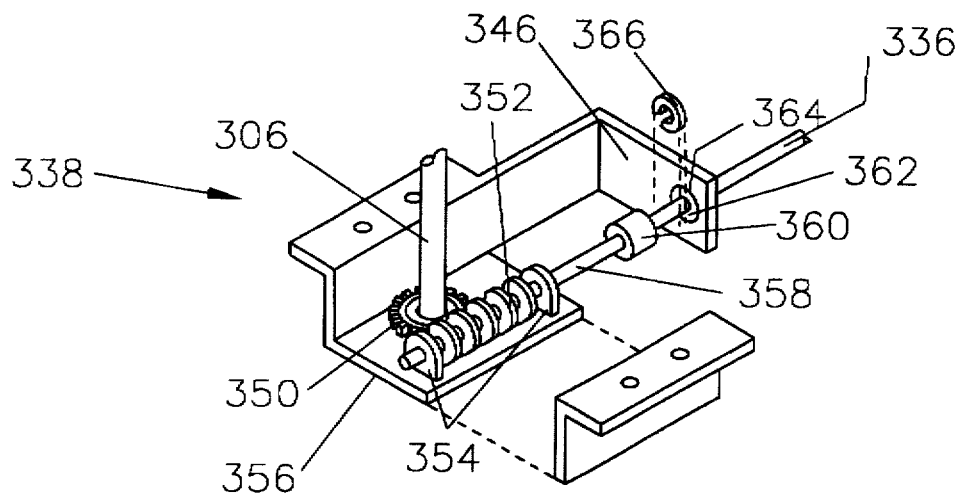
FIG. 12 is an enlarged isometric view of the second cable bracket of FIG. 11. The second cable bracket has integrated into it the worm gear assembly.

FIG. 12 is an isometric view of the worm gear assembly 338 as viewed from the duct 340 which further illustrates the interconnection of the first blade pivot shaft 306 with the worm gear assembly 338. The first blade pivot shaft 306 has attached thereto a pinion gear 350, which in turn engages a worm gear 352. The worm gear 352 is supported by a worm gear bracket 354 which is part of a worm gear assembly housing 356. The worm gear 352 has a worm gear shaft 358 which terminates in a damper regulator 360. It should be appreciated that one could have the damper regulator 360 an integral part of the worm gear 352. The unsheathed flexible torque transmitting cable 336 passes through a second bracket bearing 362 which resides in a second bracket passage 364 in the second cable bracket 346 and slidably engages a damper regulator recess (not shown) in the damper regulator 360. The unsheathed flexible torque transmitting cable 336 is maintained engaged with the damper regulator 360 by a second bracket clip 366.

Figure 13:
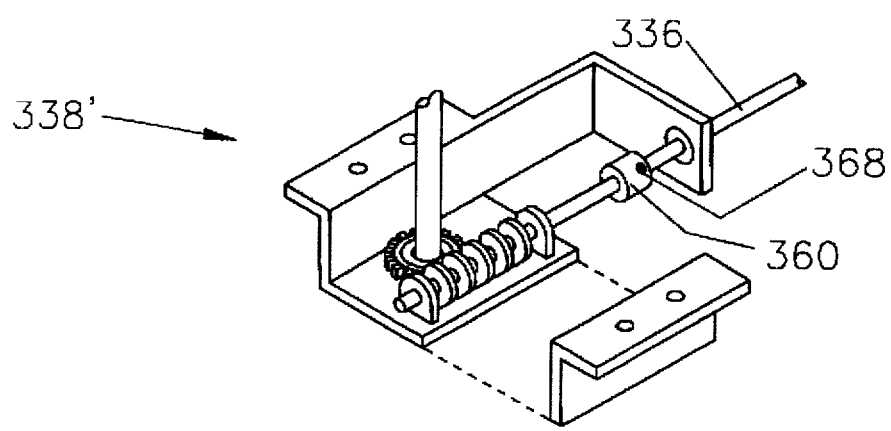
FIG. 13 is an enlarged isometric view of the worm gear assembly and second cable bracket similar to FIG. 12. The difference is that the cable end is maintained in the damper regulator with a set screw.

FIG. 13 is an isometric view of an alternate worm gear assembly 338' similar to the worm gear assembly 338 of FIG. 12. With this worm gear assembly 338' the second bracket clip 366 has been eliminated and a set screw 368 is employed to maintain the unsheathed flexible torque transmitting cable 336 engaged with the damper regulator 360.

While the present invention has been described in terms of preferred embodiments, it should be understood that substitutions and changes may be made by one skilled in the art without departing from the spirit of the invention.

What I claim is:

1. An unsheathed cable activated damper control system for an air processing system adjusted by a torque inducing tool, the air processing system having a damper controlled by a damper regulator, the unsheathed cable activated damper control system comprising:

a first cable bracket having a first cable bracket passage therethrough;

means for mounting said first cable bracket with respect to the air processing system;

an unsheathed flexible torque transmitting cable having a first cable end and a second cable end,
  said unsheathed flexible torque transmitting cable passing through said first cable bracket passage;

means for coupling said first cable end to the torque inducing tool;

means for limiting axial motion of said unsheathed flexible torque transmitting cable with respect to said first cable bracket; and means for grippably engaging said second cable end engaged with the damper regulator of the air processing system.

2. The unsheathed cable activated damper control system of claim 1 wherein said means for mounting said first cable bracket with respect to the air processing system further comprises:

a planar mating surface on said first cable bracket; and an adhesive layer applied to said planar mating surface.

3. The unsheathed cable activating damper control system of claim 2 wherein said mounting means further comprises:

at least one fastener passage normal to said planar mating surface; and at least one expandable fastener passing through said at least one fastener passage.

4. The unsheathed cable activated damper control system of claim 1 wherein said means for limiting axial motion of said unsheathed flexible torque transmitting cable with respect to said first cable bracket further comprises:

a pair of first bracket clips, said first bracket clips being attached to said unsheathed flexible torque transmitting cable, said pair of first bracket clips being so positioned that said first cable bracket passage is interposed therebetween.

5. The unsheathed cable activated damper control system of claim 4 wherein said means for grippably engaging said second cable end engaged with the damper regulator further comprises;

a second cable bracket fixably mounted with respect to the damper regulator, said second cable bracket having a second cable bracket passage therethrough,
said unsheathed flexible torque transmitting cable passing through said second cable bracket passage;

a damper regulator recess in the damper regulator into which said second cable end slidably engages;

means for preventing rotation between said damper regulator recess and said second cable end; and a second bracket clip attached to said unsheathed flexible torque transmitting cable and positioned between said second cable end and said second cable bracket, said second bracket clip being positioned such that, when in close proximity to said second cable bracket, said second cable end is engaged to said damper regulator recess.

6. The unsheathed cable activated damper control system of claim 5 wherein said means for preventing rotation between said damper regulator recess and said second cable end is provided by said damper regulator recess and said second cable end having square cross sections such that said second cable end slidably engages said damper regulator recess.

7. The unsheathed cable activated damper control system of claim 6 further comprising:

a first bracket bearing residing in said first cable bracket passage; and a second bracket bearing residing in said second cable bracket passage.

8. The unsheathed cable activated damper control system of claim 7 further comprising:

at least one tie down clip, each of said at least one tie down clips having a tie down passage through which said unsheathed flexible torque transmitting cable passes and engaging said unsheathed flexible torque transmitting cable between said first cable bracket and said second cable bracket; and means for affixing said at least one tie down clip with respect to the air processing system.

9. The unsheathed cable activated damper control system of claim 7 wherein said unsheathed flexible torque transmitting cable has a cable diameter D and said first bracket bearing has a thickness T of at least about equal to said cable diameter D.

10. The unsheathed cable activated damper control system of claim 1 wherein the damper is a radial blade damper and the damper regulator is a hub.

11. The unsheathed cable activated damper control system of claim 1 wherein the damper is a parallel axis array of blades driven by a rack and pinion mechanism and the damper regulator is the pinion gear.

12. The unsheathed cable activated damper control system of claim 1 wherein the damper is a parallel axis array of blades driven by a worm gear assembly where the damper regulator is the worm gear.

13. The unsheathed cable activated damper control system of claim 1 wherein said means for grippably engaging said second cable end engaged with the damper regulator of the air processing system is provided by bonding said second cable end to the damper regulator.

14. The unsheathed cable activated damper control system of claim 1 wherein said means for grippably engaging said second cable end engaged with the damper regulator of the air processing system further comprises:

a damper regulator recess in the damper regulator into which said second cable end slidably engages; and a set screw which passes into said damper regulator recess.

15. The unsheathed cable activated damper control system of claim 4 wherein said means for grippably engaging said second cable end engaged with the damper regulator further comprises;

a damper regulator recess in the damper regulator into which said second cable end slidably engages;

means for preventing rotation between said damper regulator recess and said second cable end.

16. The unsheathed cable activated damper control system of claim 15 further comprising:

a first bracket bearing residing in said first cable bracket passage.

17. The unsheathed cable activated damper control system of claim 16 wherein said unsheathed flexible torque transmitting cable has a cable diameter D and said first bracket bearing has a thickness T of at least about equal to said cable diameter D.

* * * * *